April 11, 1939.　　　L. S. M. LEJEUNE　　　2,153,965
MANUFACTURE OF PNEUMATIC TIRES
Filed Sept. 2, 1936
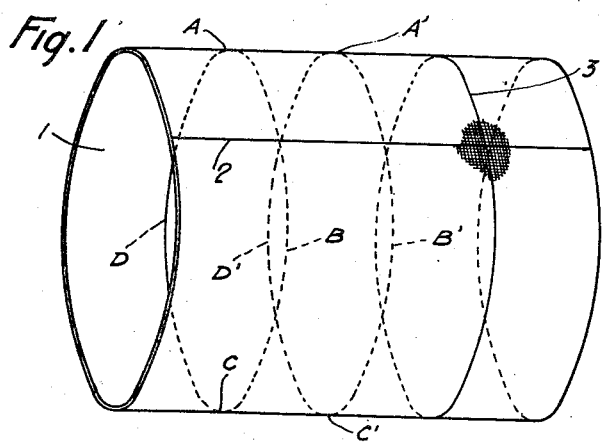
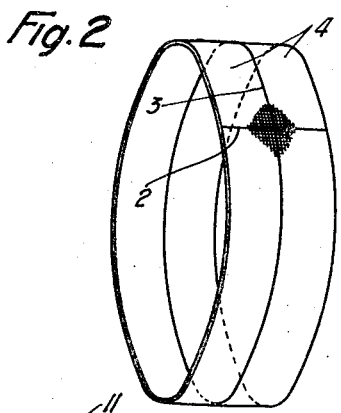
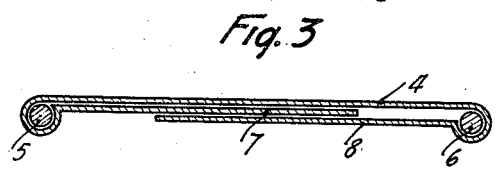
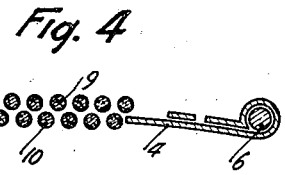
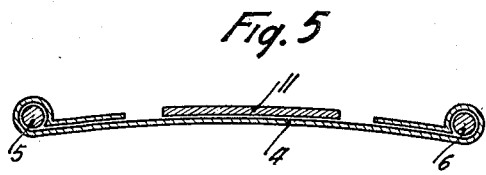
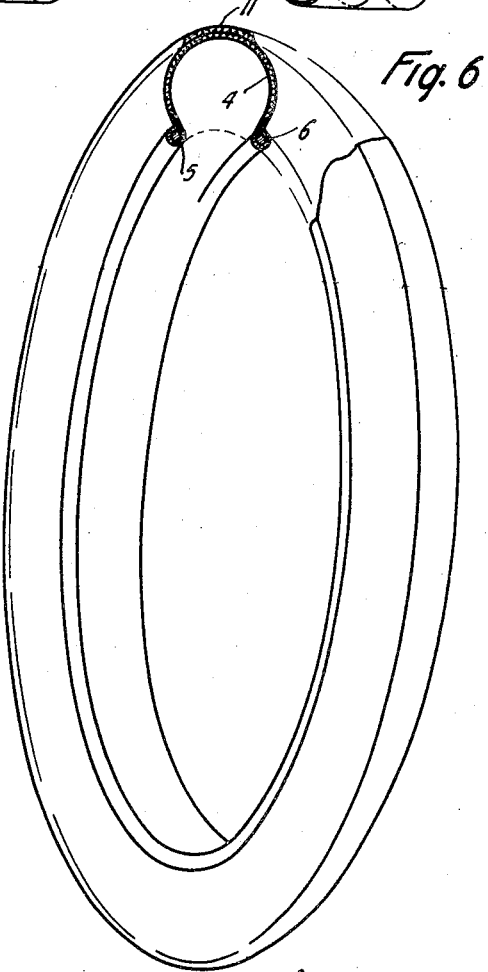
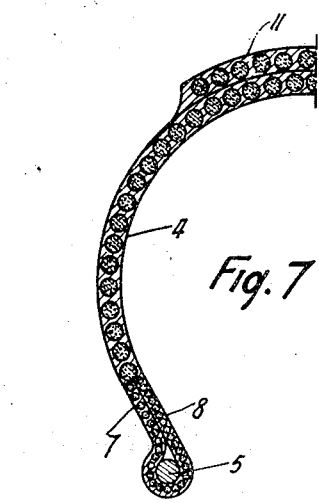
Inventor:-
Leon Sylvain Max Lejeune
By Mauro + Lewis
Attorneys Patented Apr. 11, 1939

2,153,965

UNITED STATES PATENT OFFICE 2,153,965

MANUFACTURE OF PNEUMATIC TIRES

Léon Sylvain Max Lejeune, Paris, France, assignor, by mesne assignments, to Hevaloid Corporation, Dover, Del., a corporation of Delaware Application September 2, 1936, Serial No. 99,151
In France July 13, 1934

20 Claims. (Cl. 154—14)

My present application relates to the manufacture of pneumatic tire covers, i. e., of pneumatic tire casings, for instance for cycles and automobiles, and is a continuation-in-part of my prior application Serial No. 741,706, filed August 27, 1934.

One of the essential features of the pneumatic tire cover according to the invention consists in that it is formed by a fabric ring which is woven with special linear elements without joint in the peripheral direction so as to form a continuous and endless textile fabric, and is impregnated throughout with rubber or rubber-like material.

By "linear elements" as herein used are to be understood specifically linear elements obtained by spinning rovings to which there has been given individually a supplementary twist in the same direction without stretching and which are then assembled by being twisted together in the reverse direction to the twist of the individual rovings and for a number of turns substantially equal to the total twists of each roving. The so-formed assembly is a very open and a substantially equilibrized linear element which is free from appreciable mutual compression of the constituent fibers and is highly permeable throughout. Such linear elements—so-called "inverse twists"—which have properties that are found to be of special value for the purposes of the present invention, have been described for other purposes in copending application of this applicant and Emile J. A. Lejeune, Ser. No. 99,149, filed September 2, 1936.

By "fabric" is intended herein any textile product woven in the ordinary way by the crossing of fibrous linear elements.

In the case of straight threaded fabric the linear elements of the fabric arranged in the peripheral direction are formed preferably by a continuous linear element making the number of turns necessary to pass from one of the edges to the other of the ring and intercrossing with the transverse linear elements.

The peripheral linear elements may be also interrupted or jointed, each making one or more turns, the interruptions or joints of these threads being distributed evenly upon the circumference of the ring so as to make its peripheral strength as uniform as possible.

The transverse linear elements are either interrupted at the points where they reach the edges of the ring, or are also interrupted but folded and applied upon the ring, or are continuous, passing from one edge to the other of the fabric and vice versa following a continuous zig-zag trajectory.

In the fabric according to the invention the peripheral linear elements are either of the same size (number) or of different sizes. They will be, for example, larger at the centre of the ring than at the edges, their size regularly decreasing towards the edges, or on the contrary, larger over a certain width corresponding to the tread of the cover and finer towards the edges. The fabric may likewise be more tightened as to the weft linear elements or even lined at the tread and exhibit at this point either linear elements of a size substantially equal to that of the edges of the ring or of larger size.

At the tread the cover may comprise on its outside a layer of rubber connected with the impregnating rubber of the fabric or extending it, or it may comprise a second ring (auxiliary) of unjoined fabric, impregnated with rubber and superposed on the principal ring to which it is connected by the impregnating rubber of both rings, the fabric of this auxiliary ring having a structure offering a large resistance to wear.

The cover has, on the other hand, elements for maintaining it upon the rim upon which it is intended to be mounted. These elements are either ordinary metallic wires formed by an endless metallic wire or even continuous or joined textile cords acting as wires, or moulded beads.

The wires are either incorporated into the structure of the textile ring or received in a cemented or stitched fold in the usual way, or received in a very wide fold, the edges of the folds containing the two wires being brought beyond the medial plane of the ring and covering one another, for example, for a width corresponding to the tread, these two edges being if desired, held by stitching and in any case connected to the central fabric of the ring by adhesion of the impregnating rubber.

In the case of wires held in place by a fold of the fabric, the fabric of the ring proper at the point of the fold and that of the fold itself are, for example, constituted by peripheral linear elements of smaller number (size) than the rest of the ring. This effects the diminution or even the elimination of the excessive thickness due to the fold.

In the case of beads these are present either in the form of moulded elements mounted upon the ring in the usual manner or in the form of excess thicknesses forming part of the structure itself of the fabric of the ring.

The cover, according to the invention, has if desired, besides all or part of the characteristics mentioned above that of being relatively and even largely compressible in the direction of its thickness.

Inasmuch as the cover is either curved in the form of an open or closed ring in which case its elasticity in the peripheral direction decreases from the edges to the medial part, the elasticity being on the contrary constant in the direction of the transverse linear elements; or in the form of a flat cylindrical ring in which case its elasticity may be either the same or different in the two directions.

When the cover is in the form of a closed ring which corresponds to what is called a "closed tube" there is neither wire nor bead, the two edges of the cover being connected by sewing or adhesive, or by the means of any known movable rapid closing device, for example, of the type of those known as "running" or "sliding" fastening means.

The process for the manufacture of the tire cover according to the invention consists in forming a ring of straight threaded or oblique threaded fabric without a joint and very elastic, by crossing with large meshes of textile linear elements, called "inverse twists" as hereinabove defined, capable of absorbing rubber—incorporating if desired in this fabric during weaving the means for maintaining the cover upon the rim—subjecting said woven elements to a special treatment which will be described hereinafter and comprising the action without tension of a contracting and swelling agent, impregnating the so-treated fabric ring with rubber, or rubber-like material, then in fixing to the edges of the ring its holding means if these have not been previously incorporated therein and then in giving, if desired, to the impregnated ring the form of a ring or hoop circular in cross-section, and then in vulcanizing the cover.

In forming the ring which is to constitute the textile carcass of the tire cover, a piece of fabric in tubular form is first made, which textile tube has as its length the length of the ring to be made or a multiple thereof. The fabric is so placed that its peripheral linear elements extend in parallel and continuous circumferential lines or with staggered joints, and the transverse linear elements are intercrossed with these circumferential linear elements either in the form of whole threads or in the form of linear elements passing simply from one edge to the other of the ring.

The weaving of this tube may be carried into effect upon a tubular loom so that in the case of "straight threaded" fabric the warp linear elements will become the transverse threads of the cover and the weft linear elements the peripheral linear elements. Alternatively weaving may be performed in the usual manner upon endless weaving looms and the peripheral linear elements will then be the warp linear elements and the transverse linear elements the weft linear elements.

As aforesaid the special linear elements according to the invention are woven with large meshes, i. e., with such loose meshes, that by the contracting and swelling treatment, a close-mesh fabric will be produced without however any substantial reciprocal compression taking place between the linear elements or between their fibres.

The treatment of the loose-mesh straight threaded or oblique threaded fabric is carried out without tension by means of a contracting and swelling agent which produces a considerable shrinkage, for example, by means of a caustic soda lye of 5 to 30° Baumé for 5 to 30 minutes and at a temperature of 8 to 18° C.. As already stated, the size of the meshes is chosen so that after contraction and swelling there is so to speak no transverse compression of the linear elements themselves and of their fibres, and the linear elements remain very open to impregnation.

In carrying out the contracting and swelling treatment according to the invention, it may be useful to employ a wetting agent, in order that the textile elements be fully wetted through the bath in which they are immersed. As wetting agent may be employed any wetting agent which is commonly known for the usual treatments of textiles with liquids.

The textile fabric is allowed to remain in the bath under the conditions indicated, afterwards the textile is removed from the bath and is compressed so that the greater part of the bath may be recovered.

The described treament with soda lye and washing has the effect of increasing substantially the tensile strength of the fabric and of rendering the same highly impregnable to rubber.

Preferably, after having been subjected to the treatment with the bath of contracting and swelling agent, the textile fabric ring is subjected according to the invention to a boiling treatment, which is carried out under the conditions usual for such a treatment in the textile industry, for example with the aid of carbonate of soda lye, at the high temperature suitable for boiling.

For example the boiling may be performed with the aid of a lye of carbonate of soda of 3%, to which there is added a soda soap of 1.5% under a pressure of 1.5 atm. corresponding to a temperature of 113° C. for 4 hours. The percentage always is calculated with respect to the weight of dry cotton.

After the boiling treatment, the textile fabric is rinsed with water; preferably it is first washed with warm water, then with cold water, and afterwards said fabric is submitted to a treatment with hydrochloric acid or the like, then is washed and finally is carefully dried. As an example of such a treatment, it may be indicated that, after having been boiled, the fabric is washed with warm water at 90° for about 1 hour, carefully washed with cold water, neutralized through a solution of commercial hydrochloric acid of 0.5° Bé., then anew washed till the chlorides are eliminated. Finally the treated fabric is carefully dried so that there only remains about 7% of wetness with respect to the weight of the dry cotton. The fabric is then ready for impregnation.

This impregnation is performed by a plastic or elastic substance such as any form of rubber or rubber-like material adhering to the fibres and filling as completely as possible the interstices therebetween.

When a solution is used for the impregnation, it is necessary, of course, to dry the fabric previously; but when latex or analogous natural or artificial suspension is used, drying is not necessary.

Preferably the impregnation is carried out by immersion of the textile fabric in a bath of latex, containing for example 40% of dry rubber together with the vulcanizing agents. The impregnation occurs, preferably without vacuum or pressure being applied, in vats or other receptacles which are closed with a cover which is sufficiently tight to prevent the ammonia from evaporating, which latter would result in a coagulation of the surface of the bath. After each impregnating operation, the ammonia content of the bath is brought to the required degree by adding thereto a solution of commercial ammonia.

After the impregnation, the fabric, which is then merely dripped, is placed in conditions suitable for coagulation of the rubber. To this effect, the ammonia is allowed to evaporate.

When the coagulation is effected, the impregnated fabric, is placed in such conditions that the water still contained therein evaporates for the greater part. To this effect, the fabric is calendered with an ordinary calender so as to remove the greatest possible part of water, afterwards the product can be dried in any suitable manner. Care shall be taken that the temperature of the drying apparatus be lowered as the fabric dries.

The quantity of water remaining at that time in the textile fabric will not exceed 4% of the weight of the impregnated fabric.

In most cases, the impregnating treatment of the final impregnated fabric rings to be obtained is followed by a vulcanization. The fabrics when impregnated are preserved until it is desired to vulcanize the same. For this purpose they are kept preferably in warehouses which are dimly lighted and not too damp.

The described structure of the final fabric gives it a higher elasticity and the impregnation by the rubber fixes this property, permitting it to be adjusted by tension and vulcanization to the degree desired.

For the purpose of putting the fabric ring into final condition and according to the elasticity it shall bear finally, the fabric is more or less stretched in the suitable direction, to such an extent as to keep in the said direction only the final necessary elasticity; it is then vulcanized in the usual manner.

It is to be emphasized that the construction of the cover in the form of a ring circular in cross section can be carried into effect either in advance by a known method of stretching or by the simple inflation of the air chamber of the cover after mounting this latter upon the rim which is intended to receive it.

To give to the mounted and inflated tire a lesser transverse thickness, a large portion of elasticity of the transverse linear elements is suppressed for example by exerting upon these before vulcanization a tension corresponding to the elasticity to be suppressed, and then vulcanizing the ring in this laterally distended form.

When, instead of metallic wires, cords of impregnated textile materials are used to form the elements for holding the cover on the rim, these cords will be given a previous extension before vulcanizing them to remove from them the greater part of their residual elasticity, retaining only the amount of the elasticity necessary for mounting upon the rim.

For the production of covers of large size with respect to the diameter of the rim, fabrics possessing greater elasticity are required than for small sizes.

The rings prepared singly or cut off from a tube as already described, are then brought into the form of covers by the processes described above.

In the attached drawing and by way of example there are given schematically various illustrations relative to the manufacture and to the constitution of the pneumatic tire covers according to the present invention.

In this drawing:

Figure 1 shows in perspective a first phase of manufacture;

Figure 2 a second corresponding phase;

Figure 3 indicates a transverse section of a cover before curving;

Figures 4 and 5 are analogous sections of modifications;

Figure 6 is a perspective view partly in section of a finished cover;

Figure 7 is a transverse section on a larger scale, of this cover.

According to the example of manufacture illustrated in Figures 1 and 2 upon a tubular loom is woven a tube 1 of a fabric such as those defined above; in this tube the warp threads are arranged in the direction of the thread 2 and the weft linear elements in the direction of the linear elements 3 or inversely. The weaving takes place according to any of the methods described above with a regular or irregular texture.

This tube is treated by a swelling and contracting agent (see above) and after rinsing and drying, if desired, is impregnated with rubber.

If the beads or wires or cords replacing the normal wires have been incorporated during weaving, the tube may then be distended in the direction of the linear elements 2 to diminish the elasticity in this direction to the desired amount and the tube is then vulcanized in this distended form. In order to avoid vulcanizing on the distending apparatus the tube may be left upon the distending apparatus for a time sufficient to prevent the tube shrinking immediately, and after removal from the stretching apparatus it may be vulcanized. The tube may be cut at the positions desired (lines A B C D—A' B' C' D' etc.) between two adjacent beads, wires or cords and a cover is obtained which is now complete as an article of sale and ready to be placed on the rim of a wheel and inflated in situ, as is commonly done.

Another method of operation consists in cutting the tube into separate rings 4 (Figure 2) if the beads, wires or cords are not incorporated, then in fixing the beads, wires or cords as stated above, after which the ring is distended if desired in the direction of the transverse linear elements 3 and is vulcanized. There is thus obtained a flat ring which is mounted upon the rim and curved transversely by the pressure of the air chamber.

To obtain a cover curved in advance, before mounting upon the rim, the ring is, after impregnation, with its wires, cords or beads, distended by any suitable process and is then vulcanized in the ordinary way.

In Figure 3 the impregnated fabric is seen enveloping the wires 5 and 6 and folded under the ring 4, at 7 and 8, so as to thicken the ring at the tread.

In Figure 4 the fabric is reinforced in the middle at 9 and 10 by means of linear elements of larger size than those of the rest of the ring.

In Figure 5 there is seen a band 11 of impregnated fabric forming an unjointed ring connected by cementing to the ring 4 to form the tread.

In Figure 6 is shown a curved cover corresponding to the diagram of Figure 5, comprising an impregnated fabric ring 4, an auxiliary ring 11 forming the tread, and the wires 5 and 6.

The same constituent elements are shown in Figure 7 in which the fold 7 surrounds the wire 5, and the fabric 8 of the body of the ring situated opposite this fold is thinner than the fabric of the rest of the ring, so as not to form excessive thickness by their superposition.

In making the described tubular fabric, weft threads of uniform size throughout may be used; or threads of different sizes may be used at different portions of the length of the tube. In the latter case, for example, a strip or band of determined width may first be woven with threads of relatively small size (to constitute, it may be, the marginal strip which is to be folded over the holding wire or cord) then a strip or band with threads of larger size (to constitute the main body of the cover) and then a strip of smaller size; and so on, indefinitely. From such a tube, the separate rings, to form each an independent tire cover, will be obtained by severing the tube transversely at the proper places.

In case the means for holding the cover upon the rim of the wheel consist of wires or cords 5 held by folds at the edges of the ring, as shown at 7, Fig. 7, the fold may be secured by stitching or adhesive or by both. It is of advantage in this case to use peripheral threads of smaller size in weaving the margins at the edges of the ring which are to form the fold, as indicated in Fig. 7, so that the two plies which constitute the fold will conjointly have the same thickness as the body of the fabric.

In order to obtain a stronger cover than is obtainable by the above described method, a ring of endless and jointless fabric is formed according to the present invention, having a width twice that which is required for a single cover plus the width of the tread. When making a tire cover of this extra-broad fabric ring, the latter is laid flat upon a shaping core; then the holding wires are placed as usual and the two margins of fabric that lie beyond the respective wires are folded over the middle portion of the ring and plied thereon, one upon the other, so that they overlap a distance equal to the width of the tread. Thus at this middle part of the cover (the tread portion) there are three plies of fabric; whereas, between said middle part and the edges there are but two plies. This construction is illustrated in Fig. 3 of the accompanying drawing.

The elasticity of the rubberized fabric made according to this invention in a transverse direction is so great that a tire cover made thereof has all the elasticity required for inflation when the threads composing it run in right lines relatively to the periphery. This is an important advantage, as heretofore it has been the practice, in order to obtain the elasticity necessary for inflation, especially when the carcass of the tire is composed of several plies, to cut the fabric on the bias.

It is to be understood that the process steps comprised in the present invention and specified in the following claims need not in all instances be performed in the sequence in which they are recited. For example, while it is preferable in general that the open linear element be formed into a fabric before the treatment with a contracting and swelling agent, the order of those steps may be reversed, and other like changes be made, without departure from the invention and within the scope of the appended claims.

What I claim is:

1. Process for the manufacture of the carcasses of covers for pneumatic tires which comprises weaving into a tubular loose-mesh fabric linear elements composed of rovings to which have been given individually a supplementary torsion in one direction and which have been then assembled by being twisted in the opposite direction approximately the same number of turns as the total torsion in the first direction, treating the so made tubular fabric without tension by means of a contracting and swelling agent without substantially compressing the said linear elements and their fibres and impregnating the so treated tubular fabric with elastic material.

2. Process for the manufacture of the carcasses of covers for pneumatic tires which comprises weaving into a tubular fabric linear elements composed of rovings to which have been given individually a supplementary torsion in one direction and which have been then assembled by being twisted in the opposite direction approximately the same number of turns as the total torsion in the first direction, forming of said fabric a ring of proper width for the cover of a pneumatic tire, treating the same with a contracting and swelling agent without appreciable compression of the fibres being produced, impregnating the same with an elastic material, and shaping the ring into the contour of a tire cover.

3. Process for the manufacture of the carcasses of covers for pneumatic tires which comprises weaving into a tubular fabric linear elements composed of rovings to which have been given individually a supplementary torsion in one direction and which have been then assembled by being twisted in the opposite direction approximately the same number of turns as the total torsion in the first direction, treating the so made tubular fabric with a contracting and swelling agent without appreciable compression of the fibers being produced; impregnating it with an elastic material, and cutting said fabric into rings of suitable width to form covers for pneumatic tires.

4. A process for the manufacture of a flat pneumatic tire cover capable of inflation into an oval cross-section, comprising the steps of forming an endless and unjointed ring of open-mesh fabric with linear elements formed of rovings to which have been given a supplementary torsion in one direction and which have been then assembled by being twisted together in the opposite direction and for a number of turns substantially equal to the total torsion of each roving, treating the so made ring with a contracting and swelling agent so as to bring the linear elements of the fabric close to each other without substantial reciprocal compression, impregnating the so treated ring with an elastic material, stretching the said ring in the transverse direction, and vulcanizing the same while in this stretched condition.

5. A carcass for the cover of a pneumatic tire comprising a fabric ring formed of linear elements composed of rovings to which have been given individually a supplementary torsion in one direction and assembled by being twisted in the opposite direction approximately the same number of turns as the total torsion in the first direction, said fabric being contracted and swollen and being permeated and impregnated throughout with rubber.

6. A highly flexible pneumatic tire cover comprising an endless and unjointed fabric ring formed of linear elements composed of rovings to which have been given individually a supplementary torsion in one direction and assembled by being twisted in the opposite direction approximately the same number of turns as the total torsion in the first direction, the fibers of the said fabric being contracted and swollen and being separated from each other by an elastic material adhering thereto and permeating and impregnating throughout the fabric ring.

7. In the manufacture of a pneumatic tire cover, the steps of making a tubular loose-mesh fabric from linear elements formed of rovings to which have been given individually a supplementary torsion in one direction and which have been then assembled by being twisted together in the opposite direction for a number of turns substantially equal to the total torsion of each roving; treating the said tubular fabric without tension with an agent which produces a contraction in length and a swelling of the fibers of the said linear elements without appreciable compression of the fibers taking place; impregnating the treated fabric with elastic material; and stretching, after impregnation but before vulcanization, the warp linear elements of the fabric so as to remove part of the transversal elasticity.

8. In the manufacture of a pneumatic tire cover, the steps of making a tubular loose-mesh fabric from linear elements formed of rovings to which have been given individually a supplementary torsion in one direction and which have been then assembled by being twisted together in the opposite direction for a number of turns substantially equal to the total torsion of each roving; treating the said tubular fabric without tension with an agent producing a contraction in length and a swelling of the fibers of the said linear elements without appreciable compression of the fibers taking place; and impregnating the treated fabric with elastic material, the fabric being in the form of a ring the margins of which are arranged so as to maintain the cover on a wheel rim.

9. Process for the manufacture of the carcasses of covers for pneumatic tires which comprises weaving into a tubular loose-mesh fabric linear elements composed of rovings to which have been given individually a supplementary torsion in one direction and which have been then assembled by being twisted in the opposite direction approximately the same number of turns as the total torsion in the first direction, treating the so made tubular fabric without tension by means of a bath formed of a contracting and swelling agent and added with a wetting agent, subjecting the fabric to a boiling treatment, to washing and drying, and impregnating the so treated tubular fabric with elastic material.

10. Process for the manufacture of the carcasses of covers for pneumatic tires which comprises weaving into a tubular fabric linear elements composed of rovings to which have been given individually a supplementary torsion in one direction and which have been then assembled by being twisted in the opposite direction approximately the same number of turns as the total torsion in the first direction, forming of said fabric a ring of proper width for the cover of a pneumatic tire, treating the same with a bath formed of a contracting and swelling agent and added with a wetting agent without appreciable compression of the fibres being produced, subjecting the fabric to a boiling treatment, to washing and drying, impregnating the same with an elastic material, and shaping the ring into the contour of a tire cover.

11. Process for the manufacture of the carcasses of covers for pneumatic tires which comprises weaving into a tubular fabric linear elements composed of rovings to which have been given individually a supplementary torsion in one direction and which have been then assembled by being twisted in the opposite direction approximately the same number of turns as the total torsion in the first direction, treating the so made tubular fabric with a contracting and swelling agent added with a wetting agent without appreciable compression of the fibers being produced, subjecting the fabric to a boiling treatment, to washing and drying, impregnating it with an elastic material, and cutting said fabric into rings of suitable width to form covers for pneumatic tires.

12. A process for the manufacture of a flat pneumatic tire cover capable of inflation into an oval cross-section, comprising the steps of forming an endless and unjointed ring of open-mesh fabric with linear elements formed of rovings to which have been given a supplementary torsion in one direction and which have been then assembled by being twisted together in the opposite direction and for a number of turns substantially equal to the total torsion of each roving, treating the so made ring with a contracting and swelling agent added with a wetting agent so as to bring the linear elements of the fabric close to each other without substantial reciprocal compression, subjecting the fabric to a boiling treatment, to washing and drying, impregnating the so treated ring with an elastic material, coagulating the same and drying it, stretching the said ring in the transverse direction, and vulcanizing the same while in this stretched condition.

13. A carcass for the cover of a pneumatic tire comprising a fabric ring formed of linear elements composed of rovings to which have been given individually a supplementary torsion in one direction and assembled by being twisted in the opposite direction approximately the same number of turns as the total torsion in the first direction, said fabric being contracted and swollen as well as boiled and being permeated and impregnated throughout with rubber.

14. A highly flexible pneumatic tire cover comprising an endless and unjointed fabric ring formed of linear elements composed of rovings to which have been given individually a supplementary torsion in one direction and assembled by being twisted in the opposite direction approximately the same number of turns as the total torsion in the first direction, the fibers of the said fabric being contracted and swollen as well as boiled and being separated from each other by an elastic material adhering thereto and permeating and impregnating throughout the fabric ring.

15. In the manufacture of a pneumatic tire cover, the steps of making a tubular loose-mesh fabric from linear elements formed of rovings to which have been given individually a supplementary torsion in one direction and which have been then assembled by being twisted together in the opposite direction for a number of turns substantially equal to the total torsion of each roving; treating the said tubular fabric without tension with an agent which produces a contraction in length and a swelling of the fibers of the said linear elements without appreciable compression of the fibers taking place, said contracting and swelling agent being added with a wetting agent, then subjecting the fabric to a boiling treatment, to washing and drying, impregnating the treated fabric with elastic material, coagulating the same and drying it, and stretching, after impregnation but before vulcanization, the warp linear elements of the fabric so as to remove part of the transversal elasticity.

16. In the manufacture of a pneumatic tire cover, the steps of making a tubular loose-mesh fabric from linear elements formed of rovings to which have been given individually a supplementary torsion in one direction and which have been then assembled by being twisted together in the opposite direction for a number of turns substantially equal to the total torsion of each roving; treating the said tubular fabric without tension with an agent producing a contraction in length and a swelling of the fibers of the said linear elements without appreciable compression of the fibers taking place said contracting and swelling agent being added with a wetting agent, then subjecting the fabric to a boiling treatment, to washing and drying, and impregnating the treated fabric with elastic material, the fabric being in the form of a ring the margins of which are arranged so as to maintain the cover on a wheel rim.

17. Process for the manufacture of the carcasses of covers for pneumatic tires which comprises weaving into a tubular loose mesh fabric linear elements composed of rovings as prepared for making thread to which have been given a supplementary torsion in one direction and which have been then assembled by being twisted in the opposite direction a number of turns such that the so formed linear element shows a high tensile resistance and elasticity and is widely open and highly permeable throughout by liquids, treating the so made tubular fabric without tension by means of a contracting and swelling agent without substantially compressing the said linear elements and their fibres and impregnating the so treated tubular fabric with elastic material.

18. A carcass for the cover of a pneumatic tire comprising a fabric ring formed of linear elements composed of rovings to which have been given individually a supplementary torsion in one direction and assembled by being twisted in the opposite direction, each of the so formed linear elements possessing a high tensile strength and elasticity and being permeated and impregnated throughout with rubber, the said linear elements being contracted and swollen and being united together by rubber embedding them.

19. A highly flexible pneumatic tire cover comprising an endless and unjointed fabric ring formed of linear elements composed of rovings to which have been given individually a supplementary torsion in one direction and assembled by being twisted together in the opposite direction so as to form a linear element possessing a high tensile strength and elasticity, the fibers of the said fabric being contracted and swollen and being separated from each other by an elastic material adhering thereto and permeating and impregnating throughout the fabric ring.

20. Process for the manufacture of the carcasses of covers for pneumatic tires which comprises weaving into a tubular loose mesh fabric linear elements composed of rovings as prepared for making thread to which have been given a supplementary torsion in one direction and which have been then assembled by being twisted in the opposite direction a number of turns such that the so formed linear element shows a high tensile resistance and elasticity and is widely open and highly permeable throughout by liquids, treating the so made tubular fabric without tension by means of a contracting and swelling agent without substantially compressing the said linear elements and their fibres, subjecting the fabric to a boiling treatment, to washing and drying, impregnating the same with an elastic material, and shaping the ring into the contour of a tire cover.

LÉON SYLVAIN MAX LEJEUNE.